US012665991B2

(12) United States Patent
Pertierra et al.

(10) Patent No.: US 12,665,991 B2
(45) Date of Patent: Jun. 23, 2026

(54) PROJECTION SYSTEM AND METHOD WITH DYNAMIC TARGET GEOMETRY

(71) Applicants: Dolby Laboratories Licensing Corporation, San Francisco, CA (US); Dolby International AB, Dublin (IE)

(72) Inventors: Juan Pablo Pertierra, Fishers, IN (US); Angelo Miguel Pires Arrifano, Alpes-Maritimes (FR); Clement Luc Carol Le Barbenchon, Los Angeles, CA (US); Martin J. Richards, Gig Harbor, WA (US); Barret Lippey, Foster City, CA (US)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 324 days.

(21) Appl. No.: 18/263,117

(22) PCT Filed: Feb. 1, 2022

(86) PCT No.: PCT/US2022/014793
§ 371 (c)(1),
(2) Date: Jul. 26, 2023

(87) PCT Pub. No.: WO2022/165441
PCT Pub. Date: Aug. 4, 2022

(65) Prior Publication Data
US 2024/0171710 A1 May 23, 2024

Related U.S. Application Data

(60) Provisional application No. 63/144,027, filed on Feb. 1, 2021.

(30) Foreign Application Priority Data

Feb. 1, 2021 (EP) ..................................... 21154553

(51) Int. Cl.
H04N 9/31 (2006.01)
G02B 26/08 (2006.01)
G02F 1/13 (2006.01)

(52) U.S. Cl.
CPC ........... *H04N 9/3155* (2013.01); *H04N 9/317* (2013.01); *H04N 9/3194* (2013.01); *G02B 26/0833* (2013.01); *G02F 1/1326* (2013.01)

(58) Field of Classification Search
CPC ...... H04N 9/315; H04N 9/317; H04N 9/3102; H04N 9/3155; H04N 9/3185;
(Continued)

(56) References Cited

U.S. PATENT DOCUMENTS

| 7,070,283 B2 | 7/2006 | Akutsu |
| 7,926,951 B2 | 4/2011 | Bietry |

(Continued)

FOREIGN PATENT DOCUMENTS

| JP | 2001083949 A | 3/2001 |
| JP | 2005062748 A | 3/2005 |

(Continued)

*Primary Examiner* — Sultan Chowdhury

(57) ABSTRACT

A projection system and method includes a light source configured to emit a light in response to an image data; a phase light modulator configured to receive the light from the light source and to apply a spatially-varying phase modulation on the light, thereby to steer the light and generate a projection light; and a controller configured to dynamically determine, based on at least one of a user input or a sensor signal, a target geometry of a projection surface on which the projection light is projected, determine, based on the target geometry, a phase configuration for a frame of the image data, and provide a phase control signal to the phase light modulator, the phase control signal configured to
(Continued)

cause the phase light modulator to generate the projection light in accordance with the phase configuration for the frame.

20 Claims, 6 Drawing Sheets

(58) Field of Classification Search
CPC .. H04N 9/3194; G02B 26/06; G02B 26/0816; G02B 26/0833; G02F 1/133; G02F 1/1326; G03B 21/008; G03B 21/28; G03B 21/64; G03B 21/145; G03B 21/208
See application file for complete search history.

(56) References Cited

U.S. PATENT DOCUMENTS

| | | | | | |
|---|---|---|---|---|---|
| 8,589,796 | B2 | 11/2013 | Kjeldsen et al. | | |
| 8,947,349 | B1 | 2/2015 | Hart | | |
| 9,268,520 | B1 | 2/2016 | Cederlof | | |
| 9,325,973 | B1 | 4/2016 | Hazeghi | | |
| 9,881,383 | B2 | 1/2018 | Rueb | | |
| 10,136,112 | B2* | 11/2018 | Minami | | H04N 9/3185 |
| 10,244,204 | B2 | 3/2019 | Bostick | | |
| 10,484,742 | B2 | 11/2019 | Cerda | | |
| 10,511,818 | B2 | 12/2019 | Raffa | | |
| 10,516,876 | B2 | 12/2019 | Hicks | | |
| 10,880,528 | B1 | 12/2020 | Perkins | | |
| 2011/0248913 | A1 | 10/2011 | Willis | | |
| 2013/0155378 | A1* | 6/2013 | Huang | | G02B 30/25 |
| | | | | | 353/8 |
| 2013/0229396 | A1 | 9/2013 | Huebner | | |
| 2018/0293752 | A1* | 10/2018 | Ninan | | G02B 27/0093 |
| 2018/0373129 | A1* | 12/2018 | Pertierra | | G03B 21/2066 |
| 2018/0376115 | A1 | 12/2018 | Damberg | | |
| 2019/0045173 | A1 | 2/2019 | Hicks | | |
| 2019/0121522 | A1 | 4/2019 | Davis | | |
| 2019/0222815 | A1 | 7/2019 | Watanabe | | |
| 2019/0353917 | A1 | 11/2019 | Joseph | | |
| 2019/0354747 | A1 | 11/2019 | Chi | | |
| 2020/0021786 | A1 | 1/2020 | Watanabe | | |
| 2020/0195900 | A1 | 6/2020 | Sodhi | | |
| 2020/0336713 | A1* | 10/2020 | Davies | | G02B 27/50 |
| 2021/0003854 | A1 | 1/2021 | Bartlett | | |

FOREIGN PATENT DOCUMENTS

| | | | |
|---|---|---|---|
| JP | 2007235470 | A | 9/2007 |
| JP | 4507307 | B2 | 7/2010 |
| JP | 2014056044 | A | 3/2014 |
| JP | 2019120842 | A | 7/2019 |
| JP | 2019169913 | A | 10/2019 |
| KR | 20200096811 | A | 8/2020 |
| RU | 2587502 | C2 | 6/2016 |
| WO | 2009142015 | A1 | 11/2009 |
| WO | 2016185064 | A1 | 11/2016 |
| WO | 201856194 | W | 3/2018 |
| WO | 201856195 | W | 3/2018 |

* cited by examiner

PROJECTION SYSTEM AND METHOD WITH DYNAMIC TARGET GEOMETRY

CROSS-REFERENCE TO RELATED APPLICATIONS

This application is a U.S. National Stage Application under U.S.C. 371 of International Application No. PCT/US2022/014793, which claims priority to U.S. Provisional Application No. 63/144,027 and European Patent Application No. 21154553.8, both filed on Feb. 1, 2021, each of which is incorporated by reference in its entirety.

BACKGROUND

1. Field of the Disclosure

This application relates generally to projection systems and methods of driving a projection system.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulators (SLMs), and the like. Some projection systems are based on SLMs that implement spatial amplitude modulation. In such a system, the light source provides a light field that embodies the brightest level that can be reproduced on the image, and light is attenuated (e.g., discarded) in order to create the desired scene levels. In such a configuration, light that is not projected to form any part of the image is attenuated or discarded. Light that is projected passes through a lens on one side of the projection system, which is aligned with a pre-determined screen area by adjusting elements of the projection system (e.g., the position of the system itself, the configuration of various lens optics, etc.) to ensure that the screen is perpendicular to an optical axis of the projector and that the projected image is in focus.

As such, comparative digital projection systems require a static screen geometry. In the event that the screen geometry changes (e.g., if the position or orientation of the projection system changes, either intentionally or inadvertently), the image may change.

BRIEF SUMMARY OF THE DISCLOSURE

Various aspects of the present disclosure relate to circuits, systems, and methods for projection display using phase light modulation to provide for image projection on a surface or surfaces with a dynamic geometry.

In one exemplary aspect of the present disclosure, there is provided a projection system comprising a light source configured to emit a light in response to an image data; a phase light modulator configured to receive the light from the light source and to apply a spatially-varying phase modulation on the light, thereby to steer the light and generate a projection light; and a controller configured to dynamically determine, based on at least one of a user input or a sensor signal, a target geometry of a projection surface on which the projection light is projected, determine, based on the target geometry, a phase configuration for a frame of the image data, and provide a phase control signal to the phase light modulator, the phase control signal configured to cause the phase light modulator to generate the projection light in accordance with the phase configuration for the frame.

In another exemplary aspect of the present disclosure, there is provided a projection method comprising emitting a light by a light source, in response to an image data; receiving the light by a phase light modulator; applying a spatially-varying phase modulation on the light by the phase light modulator, thereby to steer the light and generate a projection light; dynamically determining, based on at least one of a user input or a sensor signal, a target geometry of a projection surface on which the projection light is projected; determining, based on the target geometry, a phase configuration for a frame of the image data; and providing a phase control signal to the phase light modulator, the phase control signal configured to cause the phase light modulator to generate the projection light in accordance with the phase configuration for the frame.

DESCRIPTION OF THE DRAWINGS

These and other more detailed and specific features of various embodiments are more fully disclosed in the following description, reference being had to the accompanying drawings, in which.

DETAILED DESCRIPTION

Figure 1:
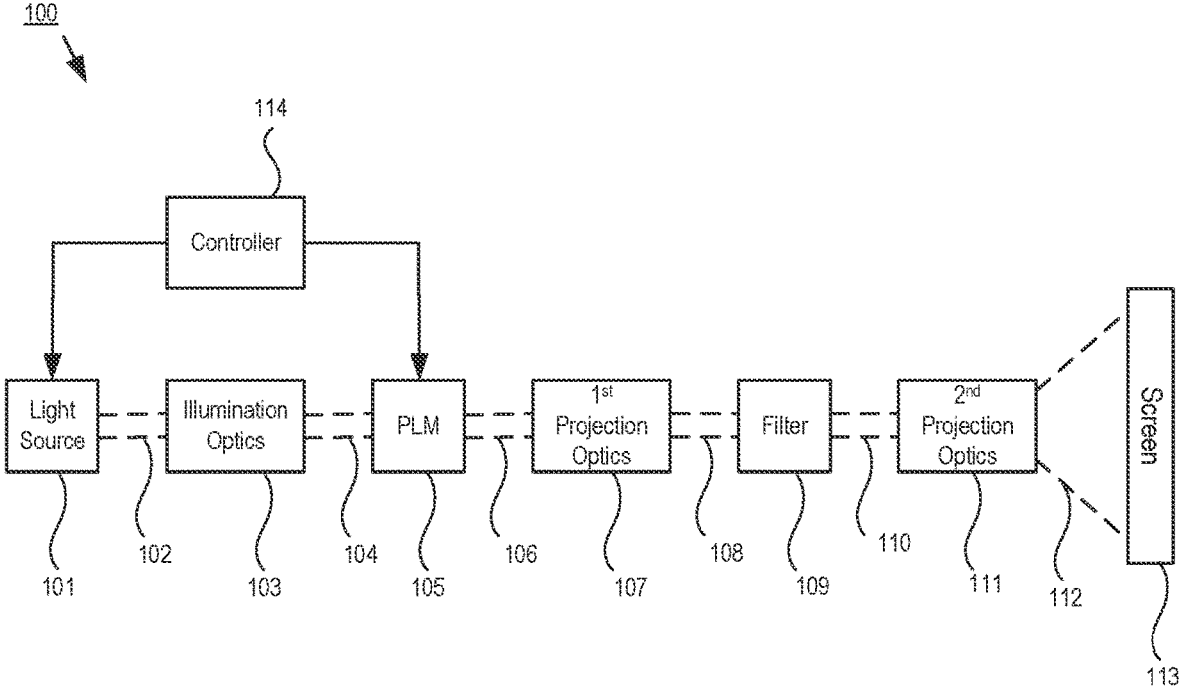
FIG. 1 illustrates a block diagram of an exemplary projection system according to various aspects of the present disclosure.

This disclosure and aspects thereof can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as circuit configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer and other commercial projection systems, heads-up displays, virtual reality displays, and the like.

Projector Systems

In a projection system based on an SLM, the device must be precisely aligned with a pre-determined screen area. The device position and lens optics must be particularly adjusted to ensure that the image is correctly aligned on the screen (e.g., the screen must be perpendicular to an optical axis of the device) and in focus. If the projector is moved, intentionally or inadvertently, the alignment may be thrown off. In environments such as home or office usage, this may occur frequently. Moreover, such projection systems typically require the screen to be flat, and any changes in or deviations from flatness of the screen may also lead to distortions of the projected image. Even in a cinema environment where the devices are large and typically located in a dedicated room, technicians spend significant time aligning the devices to the screen and/or ensuring flatness of the screen. In environments where multiple projection devices are used on a single screen (e.g., 3D cinema projection), this time increases accordingly.

The use of a phase light modulator (PLM) may alleviate these issues. For example, while a comparative projection system operates by blocking a common light source at each pixel, a PLM-based projection system operates by steering light from regions that are desired to be darker to regions that are meant to be brighter. Moreover, based on the architecture of the PLM itself, such projection systems may have significantly faster response time (i.e., the time required to change the projected image) compared to comparative projection systems.

FIG. 1 illustrates a block diagram of an exemplary projection system 100 according to various aspects of the present disclosure. Specifically, FIG. 1 illustrates a projection system 100 which includes a light source 101 configured to emit a first light 102; illumination optics 103 configured to receive the first light 102 and redirect or otherwise modify it, thereby to generate a second light 104; a PLM 105 configured to apply a spatially-varying phase modulation to the second light 104, thereby to steer the second light 104 and generate a third light 106; first projection optics 107 configured to receive the third light 106 and redirect or otherwise modify it, thereby to generate a fourth light 108; a filter 109 configured to filter the fourth light 108, thereby to generate a fifth light 110; and second projection optics 111 configured to receive the fifth light 110 and project it as a sixth light 112 onto a screen 113.

The projection system 100 further includes a controller 114 configured to control various components of the projection system 100, such as the light source 101 and/or the PLM 105. In some implementations, the controller 114 may additionally or alternatively control other components of the projection system 100, including but not limited to the illumination optics 103, the first projection optics 107, and/or the second projection optics 111. The controller 114 may be one or more processors such as a central processing unit (CPU) of the projection system 100. The illumination optics 103, the first projection optics 107, and the second projection optics 111 may respectively include one or more optical components such as mirrors, lenses, waveguides, optical fibers, beam splitters, diffusers, and the like. Moreover, while FIG. 1 illustrates a single modulator, the projection system 100 may include other modulators in addition to the PLM 105. For example, the first projection optics 107 may include an amplitude-based SLM, which may be controlled by the controller 114. With the exception of the screen 113, the components illustrated in FIG. 1 may be integrated into a housing to provide a projection device. Such a projection device may include additional components such as a memory, input/output ports, communication circuitry, a power supply, and the like.

The light source 101 may be, for example, a laser light source and the like. Generally, the light source 101 is any light emitter which emits coherent light. In some aspects of the present disclosure, the light source 101 may comprise multiple individual light emitters, each corresponding to a different wavelength or wavelength band. The light source 101 emits light in response to an image signal provided by the controller 114. The image signal includes image data corresponding to a plurality of frames to be successively displayed. The image signal may originate from an external source in a streaming or cloud-based manner, may originate from an internal memory of the projection system 100 such as a hard disk, may originate from a removable medium that is operatively connected to the projection system 100, or combinations thereof.

The filter 109 may be provided to mitigate effects caused by internal components of the projection system 100. In some systems, the PLM 105 (which will be described in more detail below) may include a cover glass and cause reflections, device switching may temporarily cause unwanted steering angles, and various components may cause scattering. To counteract this and decrease the floor level of the projection system 100, the filter 109 may be a Fourier ("DC") filter component configured to block a portion of the fourth light 108. Thus, the filter 109 may increase contrast by reducing the floor level from light near zero angle, which will correspond to such elements as cover-glass reflections, stroke transitions states, and the like. This DC block region may be actively used by the algorithm to prevent certain light from reaching the screen. In some aspects of the present disclosure, the filter 109 prevents the undesired light from reaching the screen by steering said light to a light dump located outside the active image area, in response to control from the controller 114.

The second projection optics 111 may include optical components configured to expand the field-of-view (FOV) of the projection device 101. Such optical components may include, but are not limited to, a fish-eye lens or other wide-angle optical component.

Phase Light Modulator

As illustrated in FIG. 1, the controller 114 also controls the PLM 105, which receives light from the light source 101. The PLM 105 imparts a spatially-varying phase modulation to the light, and redirects the modulated light toward the second projection optics 111. The PLM 105 may be a reflective type, in which the PLM 105 reflects incident light with a spatially-varying phase; alternatively, the PLM 105 may be of a transmissive type, in which the PLM 105 imparts a spatially-varying phase to light as it passes through the PLM 105. In some aspects of the present disclosure, the PLM 105 has a liquid-crystal-on-silicon (LCOS) architecture or may be a micro-electromechanical system (MEMS) such as a digital micromirror device (DMD).

Figure 2:
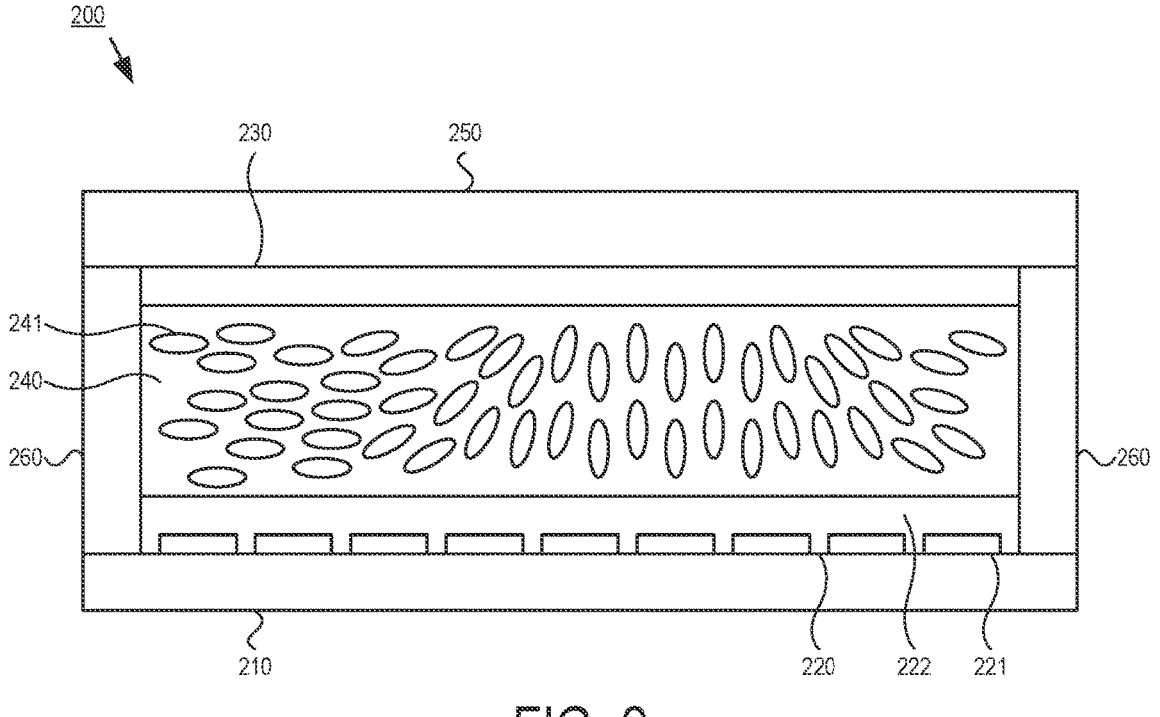
FIG. 2 illustrates an exemplary phase modulator according to various aspects of the present disclosure.

FIG. 2 illustrates one example of the PLM 105, implemented as a reflective LCOS PLM 200 and shown in a partial cross-sectional view. As illustrated in FIG. 2, the PLM 200 includes a silicon backplane 210, a first electrode layer 220, a second electrode layer 230, a liquid crystal layer 240, a cover glass 250, and spacers 260. The silicon backplane 210 includes electronic circuitry associated with the PLM 200, such as complementary metal-oxide semiconductor (CMOS) transistors and the like. The first electrode layer 220 includes an array of reflective elements 221 disposed in a transparent matrix 222. The reflective elements 221 may be formed of any highly optically reflective material, such as aluminum or silver. The transparent matrix 222 may be formed of any highly optically transmissive material, such as a transparent oxide. The second electrode layer 230 may be formed of any optically transparent electrically conductive material, such as a thin film of indium tin oxide (ITO). The second electrode layer 230 may be provided as a common electrode corresponding to a plurality of the reflective elements 221 of the first electrode layer 220. In such a configuration, each of the plurality of the reflective elements 221 will couple to the second electrode layer 230 via a respective electric field, thus dividing the PLM 200 into an array of modulation elements (e.g., pixels). Thus, individual ones (or subsets) of the plurality of the reflective elements 221 may be addressed via the electronic circuitry disposed in the silicon backplane 210, thereby to modify the state of the corresponding reflective element 221.

The liquid crystal layer 240 is disposed between the first electrode layer 220 and the second electrode layer 230, and includes a plurality of liquid crystals 241. The liquid crystals 241 are particles which exist in a phase intermediate between a solid and a liquid; in other words, the liquid crystals 241 exhibit a degree of directional order, but not positional order. The direction in which the liquid crystals 241 tend to point is referred to as the "director." The liquid crystal layer 240 modifies incident light entering from the cover glass 250 based on the birefringence $\Delta n$ of the liquid crystals 241, which may be expressed as the difference between the refractive index in a direction parallel to the director and the refractive index in a direction perpendicular to the director. From this, the maximum optical path difference may be expressed as the birefringence multiplied by the thickness of the liquid crystal layer 240. This thickness is set by the spacer 260, which seals the PLM 200 and ensures a set distance between the cover glass 250 and the silicon backplane 210. The liquid crystals 241 generally orient themselves along electric field lines between the first electrode layer 220 and the second electrode layer 230. As illustrated in FIG. 2, the liquid crystals 241 near the center of the PLM 200 are oriented in this manner, whereas the liquid crystals 241 near the periphery of the PLM 200 are substantially non-oriented in the absence of electric field lines. By addressing individual ones of the plurality of reflective elements 221 via a phase-drive signal, the orientation of the liquid crystals 241 may be determined on a pixel-by-pixel basis.

Figure 3:
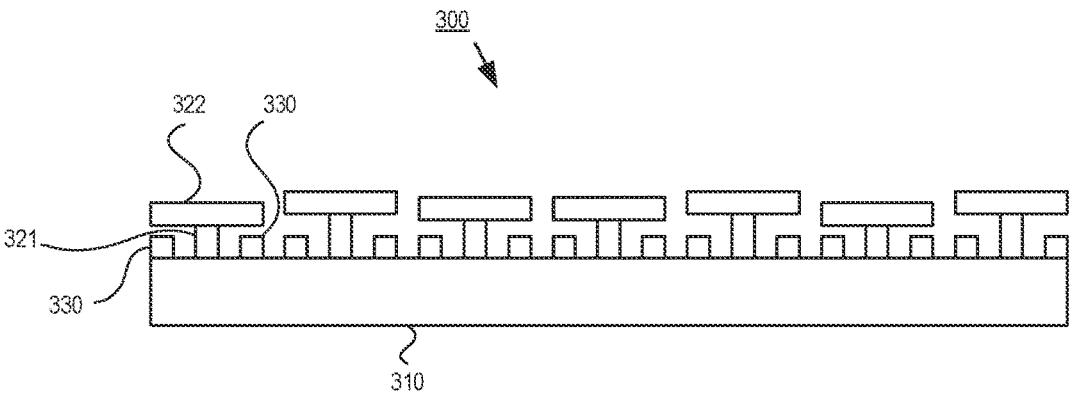
FIG. 3 illustrates another exemplary phase modulator according to various aspects of the present disclosure.

FIG. 3 illustrates another example of the PLM 105, implemented as a DMD PLM 300 and shown in a partial cross-sectional view. As illustrated in FIG. 3, the PLM 300 includes a backplane 310 and a plurality of controllable reflective elements as modulation elements, each of which includes a yoke 321, a mirror plate 322, and a pair of electrodes 330. While only two electrodes 330 are visible in the cross-sectional view of FIG. 3, each reflective element may in practice include additional electrodes. While not particularly illustrated in FIG. 3, the PLM 300 may further include spacer layers, support layers, hinge components to control the height or orientation of the mirror plate 322, and the like. The backplane 310 includes electronic circuitry associated with the PLM 300, such as CMOS transistors, a memory array, and the like.

The yoke 321 may be formed of or include an electrically conductive material so as to permit a biasing voltage to be applied to the mirror plate 322. The mirror plate 322 may be formed of any highly reflective material, such as aluminum or silver. The electrodes 330 are configured to receive a first voltage and a second voltage, respectively, and may be individually addressable. Depending on the values of a voltage on the electrodes 330 and a voltage (for example, the biasing voltage) on the mirror plate 322, a potential difference exists between the mirror plate 322 and the electrodes 330, which creates an electrostatic force that operates on the mirror plate 322. The yoke 321 is configured to allow vertical movement of the mirror plate 322 in response to the electrostatic force. The equilibrium position of the mirror plate 322, which occurs when the electrostatic force and a spring-like force of the yoke 322 are equal, determines the optical path length of light reflected from the upper surface of the mirror plate 322. Thus, individual ones of the plurality of controllable reflective elements are controlled to provide a number (as illustrated, three) of discrete heights and thus a number of discrete phase configurations or phase states. As illustrated, each of the phase states has a flat profile. In some aspects of the present disclosure, the electrodes 330 may be provided with different voltages from one another so as to impart a tilt to the mirror plate 322. Such tilt may be utilized with a light dump of the type described above.

The PLM 300 may be capable of high switching speeds, such that the PLM 300 switches from one phase state on the order of tens of $\mu$s, for example. In order to provide for a full cycle of phase control, the total optical path difference between a state where the mirror plate 322 is at its highest point and a state where the mirror plate 322 is at its lowest point should be approximately equal to the wavelength $\lambda$ of incident light. Thus, the height range between the highest point and the lowest point should be approximately equal to $\lambda/2$.

Regardless of which particular architecture is used for the PLM 105, it is controlled by the controller 114 to take particular phase configurations on a pixel-by-pixel basis. Thus, the PLM 105 utilizes an array of the respective modulation elements, such as a 960×540 array. The number of modulation elements in the array may correspond to the resolution of the PLM 105. Due to the nature of steering that can be implemented, light may be steered to any location on the reconstruction image plane and is not tied to the same pixel grid as the PLM 105. As the PLM 105 is capable of a fast response time, high-resolution moving images may be generated on the reconstruction image plane. The operation of the PLM 105 may be affected by the data bandwidth of the projection system 100, stroke quantization of the PLM 105, and/or response time of the PLM 105. The maximum resolution may be determined by the point-spread function (PSF) of the light source 101 and on parameters of various optical components in the projection system 100.

Dynamic Screen Geometry

The PLM 105, which may be the PLM 200 of FIG. 2 or the PLM 300 of FIG. 3, is capable of creating a projected image at an arbitrary distance from the projection system 100. Furthermore, the PLM 105 may form the projected image in any arbitrary shape such that the selected projection surface (e.g., the screen 114, a wall of a room containing the projection system 100, and so on) need not be perpendicular to the optical axis. In implementations where the projection surface is a flat surface, the projected image may be a 2D image. In some implementations, however, the projection surface may not be a flat surface. In such implementations, the projected image is effectively a 3D image, which may correspond to a 2D image mapped to the non-flat surface. Moreover, because the PLM 105 is a digitallycontrolled device, the effective screen geometry can be changed on the fly. In some implementations, changing the screen geometry may be performed in response to a real-time user input.

Figure 4:
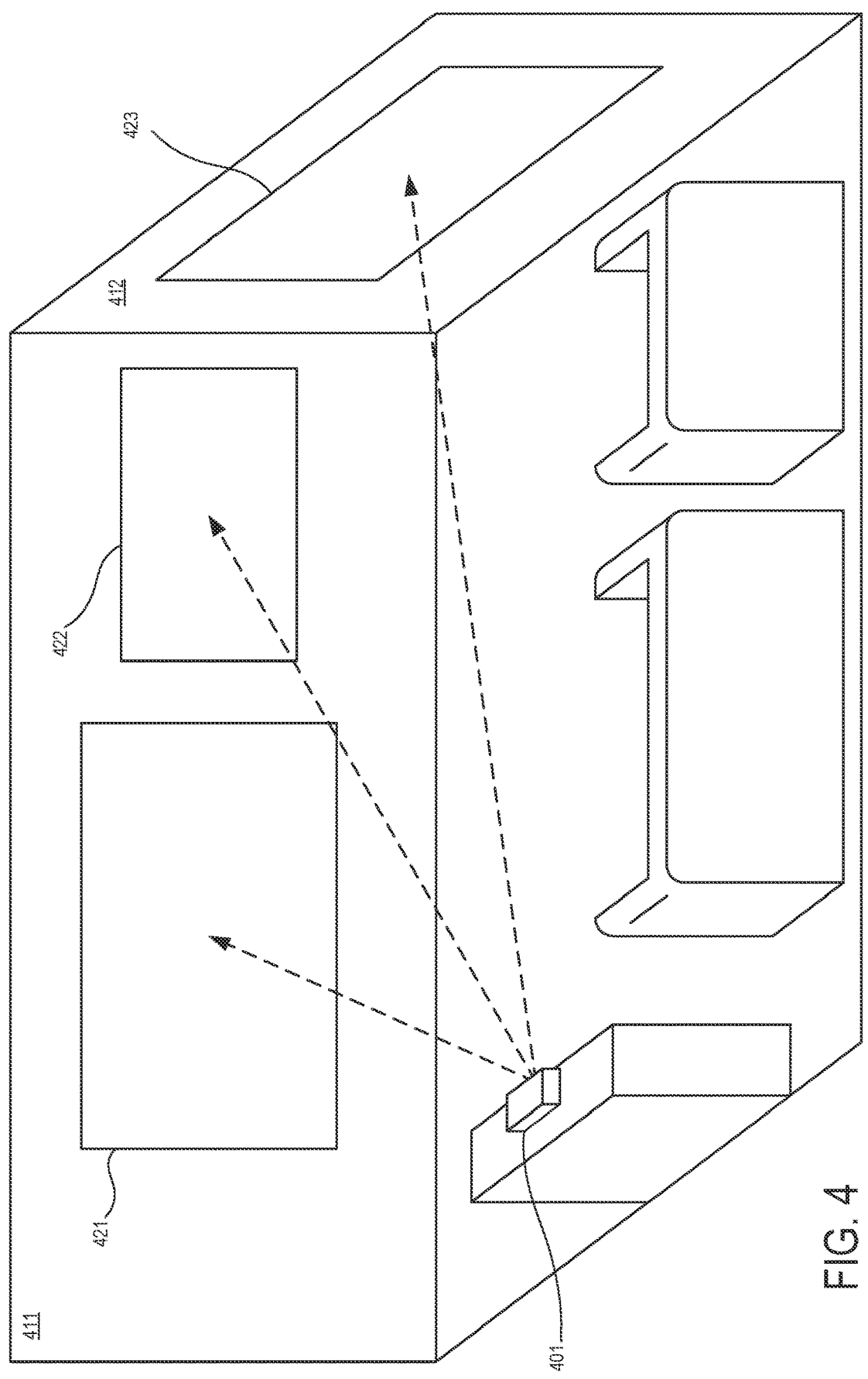
FIG. 4 illustrates an exemplary setting for a projection system according to various aspects of the present disclosure.

FIG. 4 illustrates one example of a setting in which the projection system may be implemented. In particular, FIG. 4 illustrates a projection device 401, which may be the projection system 100 illustrated in FIG. 1, excluding the screen 113. The projection device 401 is located in a room, of which a first wall 411 and a second wall 412 are shown. For ease of explanation, various elements of FIG. 4 which are not directly involved in projection (e.g., furniture) are not separately described here. While remaining stationary, the projection device 401 may dynamically project an image to one or more of multiple different locations, of which a first projection surface 421 and a second projection surface 422 on the first wall 411, and a third projection surface 423 on the second wall 412 are illustrated. The first projection surface 421, the second projection surface 422, and the third projection surface 423 may be screens or may simply be portions of the first wall 411 and the second wall 412, respectively. While only three projection surfaces are shown in FIG. 4, in practice the target projection surface may be any surface within the FOV of the projector device 401. Because the projection device 401 has a fast response time (e.g., due to the PLM 105), the projection surfaces may be not contiguous with one another and may be located on different walls.

Figure 5:
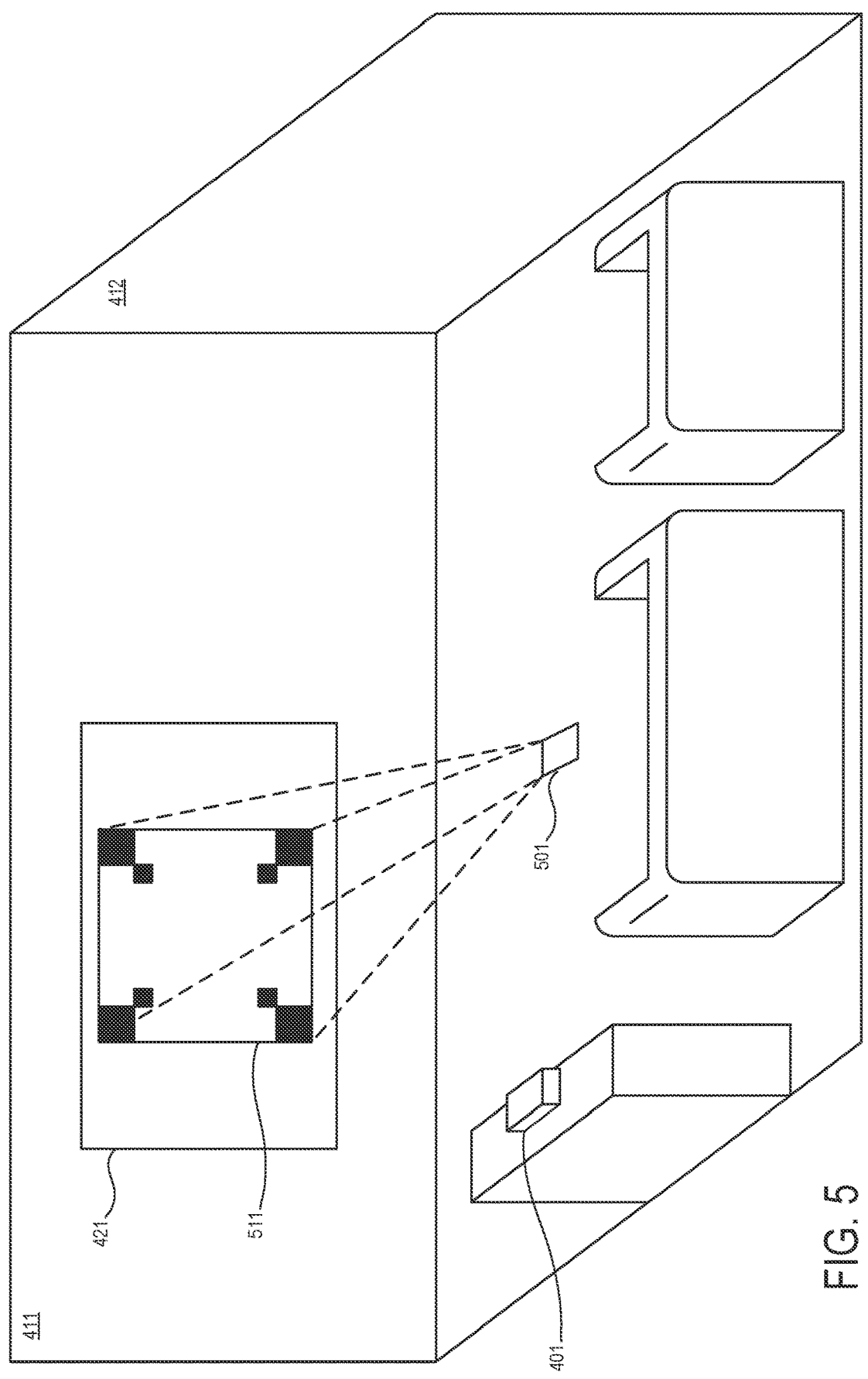
FIG. 5 illustrates another exemplary setting for a projection system according to various aspects of the present disclosure.

The image location, size, and/or other parameters may be adjusted via an interface, as illustrated in FIG. 5. In FIG. 5, a user-controlled input device 501 is illustrated, which projects a calibration code 511 onto a user-selected screen location. The input device 501 may be a remote control associated with the projection device 401, a smartphone, and the like. In some implementations, the input device 501 is configured to emit in the infrared (IR) spectrum, and thus the calibration code 511 is invisible to the human eye. To detect the calibration code 511, the projection device 401 may be provided with a camera, such as an IR sensor. The projection device 401 may locate and monitor the calibration code 511 in real time. In other implementations, the input device 501 may not emit the calibration code 511, but may instead control the projection device 401 through the use of an app installed on the input device 501. For example, a user may pre-designate a plurality of candidate screen locations (e.g., corresponding to the first projection surface 421, the second projection surface 422, and the third projection surface 423) and subsequently select from among the candidate screen locations. In still other implementations, the projection device 401 may be provided with a distance or depth sensor which detects surface features of the projection surface, such as a time-of-flight (TOF) sensor. The surface features may include flat surface features (e.g., the location and geometry) and/or non-flat surface features (e.g., geometry and relief).

The projection device 401 may include both the camera and the distance sensor, and may use one or both sensor to perform additional operations such as color correction (e.g., to accommodate for paint color) and the like. Additionally or alternatively, the input device 501 may include the camera and/or the distance sensor and communicate (e.g., transmit data representing a map of the room or portions of the room) with the projection device 401.

Figure 6:
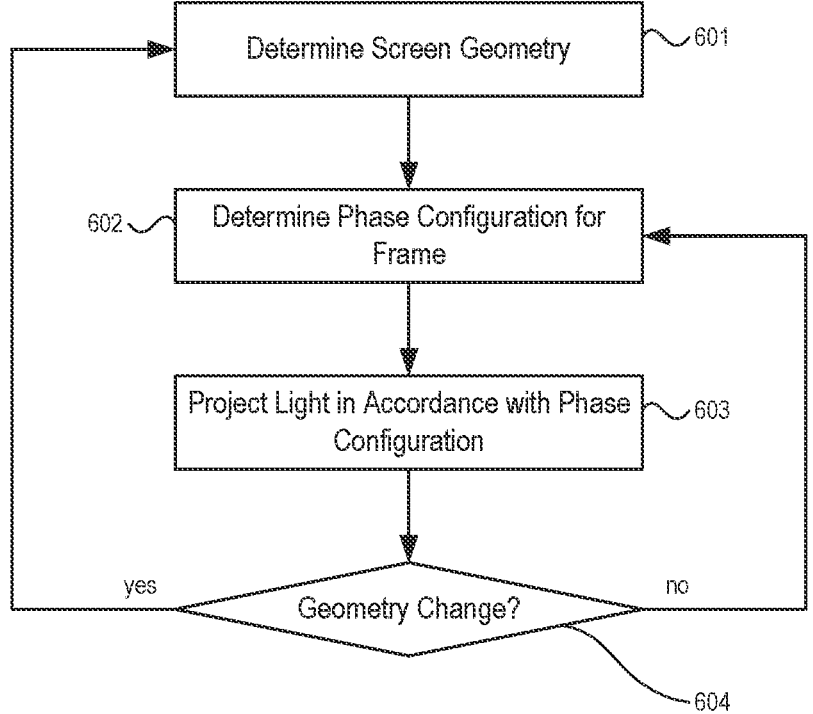
FIG. 6 illustrates an exemplary process flow according to various aspects of the present disclosure.

FIG. 6 illustrates an exemplary process flow for a projection method with dynamic screen geometry according to various aspects of the present disclosure. The process flow may be executed in or by a controller of a projection system, such as in the controller 114 of the projection system 100

(corresponding to the projection device 401) illustrated in FIG. 1. To execute the process flow, the projection system 100 may be provided with instructions stored on a non-transitory computer-readable medium (e.g., a hard disk, a removable storage medium, random access memory (RAM), and so on) which, when the instructions are executed by the controller 114, cause the projection system 100 to perform the operations of FIG. 6.

At operation 601, the controller 114 determines the location geometry, and/or relief of the screen or projection surface (generally referred to as the "target geometry" or "target configuration"). This determination may take, as an input, one or more selected from a user input, a camera input, a TOF sensor input, or similar data. The determination of operation 601 may occur in multiple stages. For example, the controller 114 may first determine a coarse location and/or geometry for the screen, and may thereafter refine the location, geometry, and/or relief. While FIG. 6 illustrates operation 601 occurring at the beginning of the process flow, in some implementations operation 601 may be repeated continually throughout image projection. The target geometry and/or relief of the projection surface are thus dynamically determined, at least because they are determined at or near the actual time of image projection.

At operation 602, the controller 114 determines the appropriate phase configuration for a frame of image data. The frame may be in the form of an image signal that is provided from an external, internal, or removable source. The image signal includes a series of frames at a rate dependent on the framerate of the particular application. Each frame includes image data for producing an image on a screen at a particular resolution. The present disclosure is not particularly limited in the framerates and/or resolutions which may be implemented. For example, the framerate may be 24 Hz or 48 Hz for cinema applications; 30 Hz, 60 Hz, or 120 Hz for home applications, and the like. Furthermore, the resolution may be 2K (2048×1080), 4K (4096×2160), 1080p (1920×1080), consumer 4K (3840×2160) and the like. The determination in operation 602 may take, as inputs, one or more selected from an output of operation 601, pixel data included in the frame of the image data, or similar data. In addition to phase configuration, operation 602 may include determining the appropriate luminance levels of the light source 101.

The determination in operation 602 may include calculating a beam-steering drive solution for the configuration of the PLM 105 that, when reconstructed, approximates the target light field. In some examples, the calculations may establish a mapping (e.g., a bidirectional mapping) between the phasor field at the modulation plane $M(x, y, 0)=A_M(x, y, 0)<\phi_M(x, y, 0)$ (referred to as a "modulation field") and the phasor field at the reconstruction plane $R(x', y', z')=A_R(x', y' z')<\phi_R(x', y' z')$ (referred to as a "reconstruction field"). The mapping may be represented as any numerical wave propagation including but not limited to Fresnel or Rayleigh-Sommerfeld methods.

At operation 603, the controller 114 controls the components of the projection system 100 to project light in accordance with the phase configuration determined in operation 603. Operation 603 may include controlling the light source 101 to emit light and/or controlling the PLM 105 to modulate light, in accordance with the phase configuration. This control may be effected through the use of an emission control signal provided to the light source 101 and/or a phase control signal provided to the PLM 105. As a result of operation 603, a frame of image data is projected onto a projection surface having the appropriate location and geometry. In implementations where operation 601 occurs continually throughout image display, operation 603 may also include emitting IR illumination multiplexed with visible light, such that the IR illumination may be detected by the projection system 100 and used to refine the determination of the screen geometry. The light source may be configured to emit infrared light multiplexed with visible light.

At operation 604, the controller 114 determines whether to change the screen geometry. If no change is to occur, the process flow returns to operation 602 to determine the appropriate phase configuration for the next frame in the image data. If a change is to occur, the process flow returns to operation 601 to determine the appropriate screen geometry before the next frame is processed and displayed. The controller 114 may determine that a change is occur in response to a user input, a signal from the camera and/or TOF sensor associated with the projection system 100, and so on. In some implementations, operation 604 may occur once per frame, in which case operations 602 to 604 are performed repeatedly for each frame. In other implementations, operation 604 may only occur once per several frames (e.g., once per second), such that operations 602 and 603 are performed repeatedly for each frame and operation 604 occurs at the appropriate interval.

Figure 7:
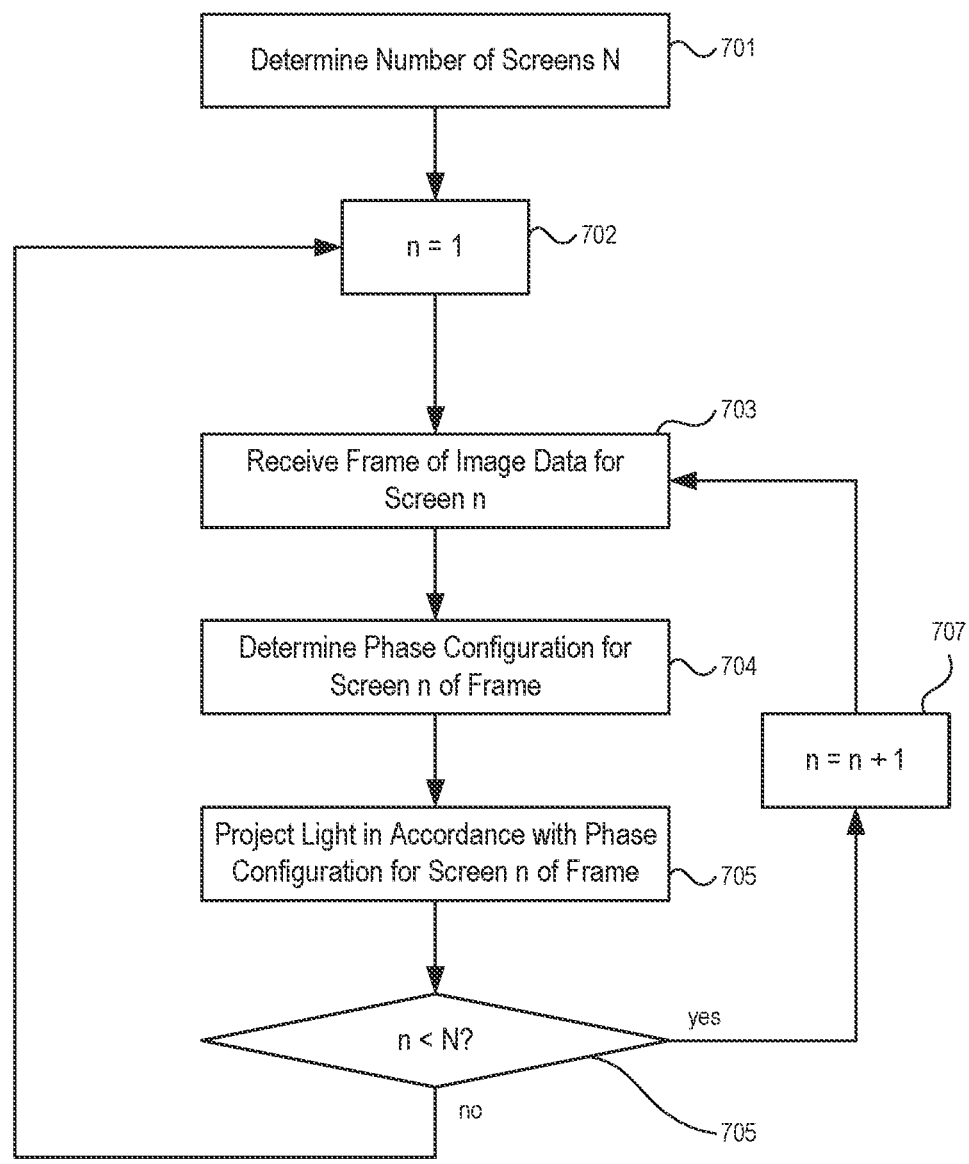
FIG. 7 illustrates another exemplary process flow according to various aspects of the present disclosure.

The projection system 100 may be configured to display multiple images on multiple projection surfaces such that they appear simultaneous to a viewer. FIG. 7 illustrates an exemplary process flow of such an operation, which may supplement or replace operations 601, 602, and/or 603 illustrated in FIG. 6. To execute the process flow, the projection system 100 may be provided with instructions stored on a non-transitory computer-readable medium (e.g., a hard disk, a removable storage medium, RAM, and so on) which, when the instructions are executed by the controller 114, cause the projection system 100 to perform the operations of FIG. 7.

At operation 701, the controller 114 determines the number of different screens (or other projection surfaces or target areas of projection surfaces), represented by the positive integer N>1. Operation 701 may also include determining the appropriate geometry of each screen. At operation 702, the index variable n, which runs from 1 to N, is initialized or reinitialized to 1.

At operation 703, the controller receives a frame of image data, and at operation 704, the controller 114 determines the appropriate phase configuration for the frame of image data corresponding to the $n^{th}$ projection surface. As above, the frame may be in the form of an image signal that is provided from an external, internal, or removable source. The image signal includes a series of frames at a rate dependent on the framerate of the particular application. Each frame includes image data for producing an image on a screen at a particular resolution. The present disclosure is not particularly limited in the framerates and/or resolutions which may be implemented. The framerate may be the base framerate divided by N. For example, the base framerate may be 24 Hz or 48 Hz for cinema applications; 30 Hz, 60 Hz, or 120 Hz for home applications, and the like. Furthermore, the base resolution may be 2K (2048×1080), 4K (4096×2160), 1080p (1920× 1080), consumer 4K (3840×2160) and the like. Thus, each frame period (i.e., the inverse of the framerate, corresponding to the duration of the frame) is divided into N subperiods. The determination in operation 704 may take, as inputs, one or more selected from an output of operation 701, pixel data included in the frame of the image data, or similar data.

In addition to the phase configuration, operation 704 may include determining the appropriate luminance levels of the light source 101.

At operation 705, the controller 114 controls the components of the projection system 100 to project light in accordance with the phase configuration determined in operation 704. Operation 705 may include controlling the light source 101 to emit light and/or controlling the PLM 105 to modulate light, in accordance with the phase configuration. This control may be effected through the use of an emission control signal provided to the light source 101 and/or a phase control signal provided to the PLM 105. As a result of operation 705, a frame of image data is projected onto the $n^{th}$ projection surface having the appropriate location and geometry. Operation 703 may also include emitting IR illumination multiplexed with visible light, such that the IR illumination may be detected by the projection system 100 and used to refine the determination of the screen geometry.

At operation 706, the controller 114 determines whether operations 703 through 704 have been completed for all N projection surfaces, by comparing the index n to N. If n is less than N, n is incremented at operation 707 and the process flow returns to operation 703. Otherwise, the process flow returns to operation 702, where n is reinitialized to 1 for the next frame in the image data.

FIG. 7 illustrates a time-divisional projection method for multiple displays, in which each frame is displayed at full luminance or resolution successively, but at a framerate that is a fraction of the base framerate. In other implementations, the projection system 100 may display the frames in a spatially-multiplexed manner. In such an implementation, each frame may be displayed, simultaneously for all N projection surfaces, at full framerate, but at a luminance or resolution that is a fraction of the base luminance or framerate.

Effects

Due to the beam-steering nature and fast response times of the projection systems and methods described herein, it is possible to achieve a projection system capable of dynamically moving and/or reshaping the image and/or screen geometry. As compared to other projection systems, the system described herein is suitable for a wide range of projection applications in a wide range of environments. For example, projection systems and methods according to the present disclosure may be suitable for home environments, office environments, live venues, automotive environments, industrial environments, commercial and/or retail environments, or group (e.g. "crowd-sourced") environments.

Moreover, while the description above primarily describes dynamically moving and/or reshaping the image to accommodate screen geometry, the present disclosure is not so limited. In some implementations, the projection systems and methods described above may dynamically move and/or reshape the image for laser safety reasons. For example, the projection systems may determine whether a person moves into the path of the beam, and move the beam away from the person (e.g., from the person's eyes).

Moreover, the above systems, methods, and effects may be achieved through the use of multiple projection devices working together, wherein the multiple projection devices are each configured according to the above aspects of the present disclosure. In such examples, the multiple projection devices may operate to cover a larger portion of a space (e.g., by tiling the respective projected images with or without overlap across a large projection surface) than would be achievable with only a single projection device, to increase brightness of the projected image (e.g., by having two or more of the multiple projection devices project the same image onto the same portion of a projection surface), and/or to effect stereoscopic projection (e.g., by having two of the multiple projectors project different-eye views of the same image onto the same portion of a projection surface). In one particular example, the individual projection devices may be implemented as, with, or using car headlights, such that one or more cars (e.g., at a drive-in theater) may work together to project images onto a large screen from different positions.

Systems, methods, and devices in accordance with the present disclosure may take any one or more of the following configurations.

(1) A projection system comprising a light source configured to emit a light in response to an image data; a phase light modulator configured to receive the light from the light source and to apply a spatially-varying phase modulation on the light, thereby to steer the light and generate a projection light; and a controller configured to dynamically determine, based on at least one of a user input or a sensor signal, a target geometry of a projection surface on which the projection light is projected, determine, based on the target geometry, a phase configuration for a frame of the image data, and provide a phase control signal to the phase light modulator, the phase control signal configured to cause the phase light modulator to generate the projection light in accordance with the phase configuration for the frame.

(2) The projection system according to (1), wherein the phase light modulator includes a plurality of modulation elements arranged in an array, and circuitry configured to modify respective states of the plurality of modulation elements in response to the phase control signal.

(3) The projection system according to (1) or (2), wherein the phase light modulator is a digital micromirror device.

(4) The projection system according to (1) or (2), wherein the phase light modulator is a liquid-crystal-on-semiconductor device.

(5) The projection system according to any one of (1) to (4), further comprising an infrared sensor configured to detect a calibration code projected onto the projection surface, and to generate the sensor signal based on the calibration code.

(6) The projection system according to any one of (1) to (5), further comprising a depth sensor configured to detect a surface feature of the projection surface, and to generate the sensor signal based on the surface feature.

(7) The projection system according to any one of (1) to (6), wherein the controller is configured to: determine a number of target areas of the projection surface; divide a frame period of the image data into a number of subperiods, the number of subperiods corresponding to the number of target areas; and in a time-divisional manner, perform the operations of dynamically determining the target geometry, determining the phase configuration, and providing the phase control signal for each subperiod.

(8) The projection system according to (7), wherein the target areas are not contiguous with one another.

(9) The projection system according to any one of (1) to (8), further comprising a filter configured to block a portion of the projection light.

(10) The projection system according to any one of (1) to (9), wherein the light source is a coherent light source.

(11) A projection method comprising emitting a light by a light source, in response to an image data; receiving the light by a phase light modulator; applying a spatially-varying phase modulation on the light by the phase light modulator, thereby to steer the light and generate a projection light; dynamically determining, based on at least one of a user input or a sensor signal, a target geometry of a projection surface on which the projection light is projected; determining, based on the target geometry, a phase configuration for a frame of the image data; and providing a phase control signal to the phase light modulator, the phase control signal configured to cause the phase light modulator to generate the projection light in accordance with the phase configuration for the frame.

(12) The method according to (11), wherein the phase light modulator includes a plurality of modulation elements arranged in an array, the method comprising: modifying respective states of the plurality of modulation elements in response to the phase control signal.

(13) The method according to (11) or (12), wherein the phase light modulator is a digital micromirror device.

(14) The method according to (11) or (12), wherein the phase light modulator is a liquid-crystal on semiconductor device.

(15) The method according to any one of (11) to (14), further comprising: detecting a calibration code projected onto the projection surface by an infrared sensor; and generating the sensor signal based on the calibration code.

(16) The method according to any one of (11) to (15), further comprising: detecting a surface feature of the projection surface by a depth sensor; and generating the sensor signal based on the surface feature.

(17) The method according to any one of (11) to (16), further comprising: determining a number of target areas of the projection surface; dividing a frame period of the image data into a number of subperiods, the number of subperiods corresponding to the number of target areas; and in a time-divisional manner, performing the operations of dynamically determining the target geometry, determining the phase configuration, and providing the phase control signal for each subperiod.

(18) The method according to (17), wherein the target areas are not contiguous with one another.

(19) The method according to any one of (11) to (18), further comprising blocking a portion of the projection light by a filter.

(20) A non-transitory computer-readable medium storing instructions that, when executed by a processor of a projection device, cause the projection device to perform operations comprising the method according to any one of (11) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Various aspects of the present invention may be appreciated from the following enumerated example embodiments (EEEs):

EEE1. A projection system, comprising:

a light source configured to emit a light in response to an image data;

a phase light modulator configured to receive the light from the light source and to apply a spatially-varying phase modulation on the light, thereby to steer the light and generate a projection light; and a controller configured to:

dynamically determine, based on at least one of a user input or a sensor signal, a target geometry of a projection surface on which the projection light is projected, determine, based on the target geometry, a phase configuration for a frame of the image data, and provide a phase control signal to the phase light modulator, the phase control signal configured to cause the phase light modulator to generate the projection light in accordance with the phase configuration for the frame.

EEE2. The projection system according to claim 1, wherein the phase light modulator includes a plurality of modulation elements arranged in an array, and circuitry configured to modify respective states of the plurality of elements in response to the phase control signal.

EEE3. The projection system according to claim 2, wherein the phase light modulator is a digital micromirror device.

EEE4. The projection system according to claim 2, wherein the phase light modulator is a liquid-crystal-on-semiconductor device.

EEE5. The projection system according to any one of claims 1 to 4, further comprising an infrared sensor configured to detect a calibration code projected onto the projection surface, and to generate the sensor signal based on the calibration code.

EEE6. The projection system according to any one of claims 1 to 5, further comprising a depth sensor configured to detect a surface feature of the projection surface, and to generate the sensor signal based on the surface feature.

EEE7. The projection system according to any one of claims 1 to 6, wherein the controller is configured to:

determine a number of target areas of the projection surface;

divide a frame period of the image data into a number of subperiods, the number of subperiods corresponding to the number of target areas; and in a time-divisional manner, perform the operations of dynamically determining the target geometry, determining the phase configuration, and providing the phase control signal for each subperiod.

EEE8. The projection system according to claim 7, wherein the target areas are not contiguous with one another.

EEE9. The projection system according to any one of claims 1 to 8, further comprising a filter configured to block a portion of the projection light.

EEE10. The projection system according to any one of claims 1 to 9, wherein the light source is a coherent light source.

EEE11. A method of driving a projection system, comprising:

emitting a light by a light source, in response to an image data;

receiving the light by a phase light modulator;

applying a spatially-varying phase modulation on the light by the phase light modulator, thereby to steer the light and generate a projection light;

dynamically determining, based on at least one of a user input or a sensor signal, a target geometry of a projection surface on which the projection light is projected;

determining, based on the target geometry, a phase configuration for a frame of the image data; and providing a phase control signal to the phase light modulator, the phase control signal configured to cause the phase light modulator to generate the projection light in accordance with the phase configuration for the frame.

EEE12. The method according to claim 11, wherein the phase light modulator includes a plurality of modulation elements arranged in an array, the method comprising:

modifying respective states of the plurality of modulation elements in response to the phase control signal.

EEE13. The method according to claim 12, wherein the phase light modulator is a digital micromirror device.

EEE14 The method according to claim 12, wherein the phase light modulator is a liquid-crystal-on-semiconductor device.

EEE15. The method according to any one of claims 11 to 14, further comprising: detecting a calibration code projected onto the projection surface by an infrared sensor; and generating the sensor signal based on the calibration code.

EEE16. The method according to any one of claims 11 to 15, further comprising:

detecting a surface feature of the projection surface by a depth sensor; and generating the sensor signal based on the surface feature.

EEE7. The method according to any one of claims 11 to 16, further comprising:

determining a number of target areas of the projection surface;

dividing a frame period of the image data into a number of subperiods, the number of subperiods corresponding to the number of target areas; and in a time-divisional manner, performing the operations of dynamically determining the target geometry, determining the phase configuration, and providing the phase control signal for each subperiod.

EEE18. The method according to claim 17, wherein the target areas are not contiguous with one another.

EEE19. The method according to any one of claims 11 to 18, further comprising blocking a portion of the projection light by a filter.

EEE 20. A non-transitory computer-readable medium storing instructions that, when executed by a processor of a projection device, cause the projection device to perform operations comprising the method according to any one of claims 11 to 19.

The invention claimed is:

1. A projection system, comprising:

a light source configured to emit a light in response to an image data;

a phase light modulator configured to receive the light from the light source and to apply a spatially-varying phase modulation on the light, thereby to steer the light and generate a projection light; and a controller configured to:

dynamically determine, based on at least one of a user input or a sensor signal, a target geometry and a relief of a projection surface on which the projection light is projected, determine, based on the target geometry and the relief, a phase configuration for a frame of the image data by calculating a beam-steering drive solution for the phase light modulator based on the target geometry and relief that, when reconstructed, approximates the image data, and provide a phase control signal to the phase light modulator, the phase control signal configured to cause the phase light modulator to generate the projection light in accordance with the phase configuration for the frame.

2. The projection system according to claim 1, wherein the phase light modulator includes a plurality of modulation elements arranged in an array, and circuitry configured to modify respective states of the plurality of elements in response to the phase control signal.

3. The projection system according to claim 2, wherein the phase light modulator is a digital micromirror device or a liquid-crystal-on-semiconductor device.

4. The projection system according to claim 1, further comprising an infrared sensor configured to detect a calibration code projected onto the projection surface, and to generate the sensor signal based on the calibration code.

5. The projection system according to claim 1, further comprising a user-controlled input device configured to project a calibration code onto a user-selected projection surface.

6. The projection system according to claim 5, wherein the user-controlled input device is configured to emit light in the infrared spectrum.

7. The projection system according to claim 1, further comprising a depth sensor configured to detect a surface feature of the projection surface, and to generate the sensor signal based on the surface feature.

8. The projection system according to claim 7, wherein the surface feature includes non-flat surface features.

9. The projection system according to claim 1, wherein the light source is a coherent light source.

10. A method of driving a projection system, comprising:

emitting a light by a light source, in response to an image data;

receiving the light by a phase light modulator;

applying a spatially-varying phase modulation on the light by the phase light modulator, thereby to steer the light and generate a projection light;

dynamically determining, based on at least one of a user input or a sensor signal, a target geometry and a relief of a projection surface on which the projection light is projected;

determining, based on the target geometry and the relief, a phase configuration for a frame of the image data by calculating a beam-steering drive solution for the phase light modulator based on the target geometry and relief that, when reconstructed, approximates the image data; and providing a phase control signal to the phase light modulator, the phase control signal configured to cause the phase light modulator to generate the projection light in accordance with the phase configuration for the frame.

11. The method according to claim 10, wherein the phase light modulator includes a plurality of modulation elements arranged in an array, the method comprising:

modifying respective states of the plurality of modulation elements in response to the phase control signal.

12. The method according to claim 11, wherein the phase light modulator is a digital micromirror device or a liquid-crystal-on-semiconductor device.

13. The method according to claim 10, further comprising:

detecting a calibration code projected onto the projection surface by an infrared sensor; and generating the sensor signal based on the calibration code.

14. The method according to claim 10, further comprising projecting, by a user-controlled input device, a calibration code onto a user-selected projection surface.

15. The method according to claim 14, further comprising emitting, by the user-controlled input device, light in the infrared spectrum.

16. The method according to claim 10, further comprising:

detecting a surface feature of the projection surface by a depth sensor; and generating the sensor signal based on the surface feature.

17. The method according to claim 16, wherein the surface feature includes non-flat surface features.

18. A non-transitory computer-readable medium storing instructions that, when executed by a processor of a projection device, cause the projection device to perform operations comprising the method according to claim 10.

19. A projection system, comprising:

a light source configured to emit a light in response to an image data;

a user-controlled input device configured to project a calibration code onto a user-selected projection surface;

a phase light modulator configured to receive the light from the light source and to apply a spatially-varying phase modulation on the light, thereby to steer the light and generate a projection light; and a controller configured to:

dynamically determine, based on at least one of a user input or a sensor signal, a target geometry and a relief of a projection surface on which the projection light is projected, determine, based on the target geometry and the relief, a phase configuration for a frame of the image data, and provide a phase control signal to the phase light modulator, the phase control signal configured to cause the phase light modulator to generate the projection light in accordance with the phase configuration for the frame.

20. A method of driving a projection system, comprising:

projecting, by a user-controlled input device, a calibration code onto a user-selected projection surface;

emitting a light by a light source, in response to an image data;

receiving the light by a phase light modulator;

applying a spatially-varying phase modulation on the light by the phase light modulator, thereby to steer the light and generate a projection light;

dynamically determining, based on at least one of a user input or a sensor signal, a target geometry and a relief of a projection surface on which the projection light is projected;

determining, based on the target geometry and the relief, a phase configuration for a frame of the image data; and providing a phase control signal to the phase light modulator, the phase control signal configured to cause the phase light modulator to generate the projection light in accordance with the phase configuration for the frame.

*    *    *    *    *